United States Patent [19]

Cohen

[11] 4,105,840

[45] Aug. 8, 1978

[54] INTERNALLY COATED REACTION VESSEL FOR USE IN OLEFINIC POLYMERIZATION

[75] Inventor: Louis Cohen, Avon Lake, Ohio

[73] Assignee: The B. F. Goodrich Company, Akron, Ohio

[21] Appl. No.: 807,957

[22] Filed: Jun. 20, 1977

[51] Int. Cl.$^2$ .......................... C08F 2/18; C08F 14/06
[52] U.S. Cl. ....................................... 526/62; 427/230
[58] Field of Search ................. 252/396, 407; 526/62; 260/652.5 P; 427/230, 236

[56] References Cited

U.S. PATENT DOCUMENTS 3,959,235  5/1976  Nishigaki ............................... 526/62

Primary Examiner—Ronald H. Smith
Assistant Examiner—S. Silverberg
Attorney, Agent, or Firm—Roy P. Wymbs

[57] ABSTRACT

This invention relates to a polymerization reaction vessel having an approximate monolayer coating on the inner surfaces thereof which is obtained by applying thereto an aqueous coating solution containing a tannin, such as, for example, tannic acid. When polymerizing olefinic monomers, such as vinyl halides, vinylidene halides, and vinylidene monomers having at least one terminal $CH_2=C<$ grouping, in such a coated reaction vessel, polymer buildup on the inner surfaces thereof is substantially eliminated. Multiple charges of polymer can be made in said coated vessel without opening the same between charges thus preventing the escape of unreacted monomer to the atmosphere.

11 Claims, No Drawings

INTERNALLY COATED REACTION VESSEL FOR USE IN OLEFINIC POLYMERIZATION

BACKGROUND OF THE INVENTION

Various polymerization processes are usually carried out in large vessels or reactors having a stirring or agitation means mounted therein and also, are frequently provided with auxiliary equipment, such as baffles, and the like. In many cases, such processes eventually produce undesirable polymer deposits on the internal surfaces of the reactor during the course of the polymerization reaction. Such deposits interfere with the different transfer of heat to and from the interior of the reactor. Further, these polymer deposits or buildup have a tendency to deteriorate and to partially fragment resulting in contamination of the reaction mixture and the products produced therefrom. This buildup of solid polymer on reactor surfaces not only interferes with heat transfer, but also decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems have a tendency to be unstable and during the polymerization reaction, vinyl chloride polymer, such as polyvinyl chloride (PVC) builds up on the interior surfaces of the polymerization reactor, including the surfaces of the baffles and agitator. Obviously, the polymer buildup must be removed since it results in further formation of polymer buildup which in turn results in a crust that adversely affects heat transfer and contaminates the polymer being produced.

The nature of the polymer buildup, or insoluble deposit on the walls of the reactor, is such that in the commercial production of polymers, as described above, it has in the past been standard practice, after each polymerization reaction is completed, to open the reactor and scrape the polymer buildup off the walls and off the baffles and agitator. An operation such as this is not only costly, both in labor and down-time of the reactor, but presents potential health hazards as well. While various methods have heretofore been proposed to reduce the amount and nature of polymer buildup on polymerization reactor surfaces, such as solvent cleaning, various hydraulic and mechanical reactor cleaners, and the like, none has proved to be the ultimate in polymer buildup removal. That is to say, these various methods and apparatus have done an acceptable job, but there is still room for improvement in this area, particularly from an economic point of view.

It is also known to coat the internal surfaces of reactors with various chemical substances in coating solutions to prevent buildup of polymer on said surfaces. Many of these coating solutions give excellent results. However, for purposes of economics and ease of handling, it would be most desirable to have a material soluble in water which, when applied to the internal surfaces of a reactor from a water solution, would prevent polymer buildup thereon.

SUMMARY OF THE INVENTION

I have unexpectedly found that when the interior surfaces of a polymerization reactor are coated with an aqueous solution containing a tannin, polymer buildup on said interior surfaces of the reactor is substantially eliminated. Due to the nature of the coating solution or composition, it can be applied to the inner surfaces of the reactor without opening the same thus providing a closed polymerization system. By use of the instant coating composition, the necessary surface tension ($\gamma_c$) for wetting of a solid surface is obtained. In polymerizing the monomers in such a coated reaction vessel or reactor, the same is done in an aqueous polymerization medium which is kept in constant contact with said coated surfaces throughout the polymerization reaction.

DETAILED DESCRIPTION

In accordance with the present invention, a film or coating of a tannin is applied to the interior surfaces of a polymerization reactor or vessel by merely contacting said surfaces with an aqueous solution of said tannin. Likewise, all exposed surfaces in the interior of the reaction, such as the baffles, agitator or mixing mechanism, the condenser when one is employed, and the like, are also treated in like manner. After the application of the tannin to the interior surfaces of the reactor, the surfaces are rinsed with water, such as by spraying or by filling the reactor with water and draining, thereby, surprisingly, leaving on said surfaces a tightly adhering coating or film of tannin which is not affected by the polymerization medium even though vigorously agitated during the polymerization reaction.

The tannins or tannates used herein are those obtained by leaching and extracting wood, leaves, bark, galls, nuts, and fruits of certain trees and plants. The wood, leaves, bark, etc., are usually leached with acetone and/or water and thereafter, the solution is extracted with ethyl acetate and then the ethyl acetate is evaporated. The tannins are usually identified from the source of extraction, that is, the tree or plant, for example "chestnut tannins" which are obtained by leaching and extracting the wood of a chestnut tree.

In accordance with an article appearing in TAPPI Monograph Series — No. 6, published in 1948 by the "Technical Association of The Pulp and Paper Industry," pages 146 to 161, the tannins are divided into two main groups, namely, hydrolyzable tannins and condensed tannins. The hydrolyzable tannins are those in which the benzene nuclei are united in a larger complex by means of oxygen atoms and can be split into simple components by acids or hydrolyzing enzymes, such as tannase and emulsin. The condensed tannins are those in which the nuclei are held together by carbon linkages and they cannot be cleaved by acids and enzymes.

As examples of the hydrolyzable tannins and their source, there may be named chinese gall or tannic acid, *myrobalans tannins* (nuts), *valonia tannins* (cups and beards), chestnut tannins (wood), divi-divi tannins (pods), and the like. As examples of the condensed tannins and their source, there may be named oak tannins (bark), hemlock tannins (bark), wattle tannins (bark), sumach tannins (leaves), quebracho tannins (wood), mangrove tannins (bark), gambier tannins (leaves), and the like. Both classes of tannins work equally well in the present invention.

One of the important tannins is tannic acid which is also obtained from the extraction of oak and sumach nutgalls. Tannic acid is a lustrous, faintly yellowish, amorphous powder occurring as glistening scales or spongy mass. Its properties are described in the "Condensed Chemical Dictionary," 9th Edition, published by Van Nostrand Reinhold Company. In addition to tannic acid, the preferred tannins are ammonium tannate and the quebracho, chestnut and wattle tannins or extracts.

The coating solutions of the tannins are on the acid side having a pH in the range of about 3.0 to about 5.0. It was found, for example in the case of tannic acid, that if the solution is partly neutralized with sodium hydroxide to a pH greater than 5, the adsorption of the coating on the surface was adversely affected and accordingly, the acid condition is preferred. However, it was unexpectedly found that neutralization with $NH_4OH$ is unique in that a pH of 7 can be employed with good to excellent adsorption. It was further found that the inclusion in the coating solution of controlled amounts of metal ions complex with the ammonium tannate, and other natural tannins to give more resistant adsorbed coatings on the surfaces of the reactor. The inclusion of metal ions with the tannins in the coating solution is not necessary since the tannins alone will accomplish the objectives of the present invention in suspension polymerization processes. The use of tannins complexed with metal ions is preferred in emulsion polymerization processes since some tannin coatings are susceptible of removal by the surfactants normally employed in emulsion polymerization recipes.

Normally, demineralized water is used in making the coating solutions of tannins. Calcium and magnesium ions can be introduced into the coating solution by using controlled amounts of city or tap water in making up the coating solution. In addition, aluminum ions can be employed by the addition to the coating solution of controlled amounts of aluminum chloride. The amount of metal ions in the coating solution of the tannins will vary but usually will be in the range of about 20 ppm to about 200 ppm. The amount of any one metal ion will vary within this range. For example, when adding tap water to the coating solution, it will contain approximately 20 ppm of calcium and 3 ppm of magnesium. Of course this will vary depending upon the source of tap water. The tap water to be used can be analyzed to determine the metallic content and thus determine the amount to be used in making the coating solution of the tannin.

I have found that a concentration of tannin or tannate in the range of about 0.03 to about 5.0% by weight in water is satisfactory in accomplishing the objectives of the present invention and such coating solutions are practically colorless or are only slightly amber-colored. Preferably, a concentration of tannin in water from 0.1 to 0.5% is employed.

In order to prevent polymer buildup in a reactor, you need a water-wettable surface. An ordinary solid surface, such as stainless steel for example, is not water-wettable due to the normal contamination of said surface with organic materials through contact with the atmosphere. The surface can be cleaned, such as with chromic acid or an abrasive cleanser, for example, and it will become water-wettable. However, this is not the full answer, since the surface will not remain in that condition for a sufficient length of time, that is, for more than the duration of a single polymerization reaction. That is to say, the surface must be recleaned after each polymerization cycle. Therefore, applying a coating to the surface which will be water-wettable and resist polymer buildup thereon and remain on said surface throughout multiple reaction cycles is more desirable.

When a metal or solid surface is nonwettable, a liquid, such as water, thereon will form droplets and not flow out into a smooth uniform film. The angle formed between the tangent of the side of the droplet and the metal or glass surface is called the "contact angle" and is referred to as "theta" ($\theta$). A further measurement of the wettability of a solid surface is the critical surface tension for wetting a solid surface and is expressed as "$\gamma_c$". The $\gamma_c$ is measured in dyness per centimeter. Using water as the standard, in order for a solid surface to be wettable, $\theta$ must equal zero or be very close to it, and $\gamma_c$ must be 72 dyness/cm. or greater.

More importantly, the material being applied to the surface should not only form a wettable surface, but also form a layer or film thereon which is not readily removable. This film adheres to the solid or metal surface by adsorption and in many cases, the film is a monolayer of the material applied which is of the order of a molecule in thickness. The films of the coating compositions of the instant invention have a thickness of about 20Å or less thus indicating a film approximately 1 molecule in thickness. The film or layer formed by the coating composition applied to the surface is not removable by washing with water. This is to say, the coating or film is resistant to removal from the surfaces when a turbulent aqueous reaction medium is in contact therewith, caused by the agitation of the polymerization mixture in the reactor.

The coating solutions of the instant invention are made by conventional methods, using heat and agitation where necessary. Usually a temperature in the range of about 5° to about 100° C. is satisfactory. Agitation during dissolution is desirable. When the concentration of the tannin is within the ranges given above, the aqueous coating solution may be easily sprayed on the inner surfaces of the reactor through spray nozzles mounted thereon. The molecular weight of the tannin has an effect on the concentration of the tannin in the coating solution or the total solids content of said solution. The total solids content of the tannin in the coating solutions of the present invention will be in the range of about 0.1 to about 0.5% by weight. The tannins used in the invention are those having an average molecular weight in the range of about 500 to about 3000. However, since the molecular weight of the tannin affects the total solids content in the coating solution, the total solids content could, in certain instances, be greater than 0.5 or less than 0.1% by weight.

As previously pointed out, the coating solution is usually applied to the inner reactor surfaces by spraying. However, it is also possible to apply the coating solution by flooding the reactor and then draining, or painting or brushing on, but spraying is the most practical and economical method of application. After applying the coating solution to the inner surfaces of the reactor, the coated surfaces are sprayed with water and the reactor drained prior to charging the reactor with the polymerization mixture or recipe. It should also be pointed out that the present coating works equally well on glass or metal surfaces, such as stainless steel, and the like.

While the exact adhesion mechanism of the coating to the surfaces of the reactor is not known for certain, it is believed to involve some type of electrical force or adsorption between the reactor surfaces and the tannin. At any rate, the coating composition of the present invention does substantially eliminate polymer buildup on the reactor surfaces and what little polymer buildup, if any, that may occur, is of the sandy type which is of such a nature that it is readily removable from the reactor surfaces without the necessity of manual scraping procedures. The polymer buildup to be avoided is what is referred to as "paper buildup" since this type of buildup is very difficult to remove and usually requires hand scraping or the use of a high pressure jet stream of water or other liquid. In either event, the reactor must be opened in order to clean the same, which, of course, allows the escape of unreacted vinyl chloride into the atmosphere.

In accordance with the present invention, multiple polymerizations may be run without opening the reactor between charges. Although multiple charges may be run without recoating the surfaces, it has been found to be expeditious, and preferred, to recoat the internal surfaces of the reactor after each charge to insure uniform and efficient production. As previously pointed out, with the spray nozzles permanently mounted at strategic points on the reactor, it is possible to reach all inner surfaces thereof. When it is decided to recoat the reactor, the reactor is drained, and the inner surfaces of the reactor are flushed with water. The coating solution is sprayed on the surfaces by means of the spray nozzles and the reactor is drained of the excess solution in such a way that the same can be sent to a recovery system, if desired. Then the surfaces are sprayed with water and effluent is discarded, or recovered, if desired. Thereafter, the reactor is charged with the polymerization medium and ingredients in the usual manner and the polymerization reaction commenced. It is understood, of course, that one can recoat the reactor as often as desired without opening the same, even after every charge is polymerized.

After the application of the coating composition on the interior surfaces of the reaction vessel and spraying thereof with water, the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein.

While the present invention is specifically illustrated with regard to suspension polymerization of vinyl chloride, it is to be understood that the apparatus and process may likewise be applied in the dispersion, emulsion, or suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in a mixture with one or more other vinylidene monomers having at least one terminal $CH_2=C<$ grouping, copolymerizable therewith in amounts as great as about 80% or more by weight, based on the weight of the monomer mixture, since polymer buildup in the reaction vessel is a particularly bad problem here.

In the present invention, the polymerization process is usually conducted at a temperature in the range of about 0° to about 100° C. depending upon the particular monomer or monomers being polymerized. However, it is preferred to employ temperatures in the range of about 40° to about 70° C., since, at these temperatures polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional make-up liquid containing the monomer or monomers in the same proportion as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

The tannins used in the present invention will oxidize on exposure to oxygen or air. This oxidation is not detrimental if the tannin is used within a very short time after such exposure. However, the adherence of the tannins to the reactor surfaces is adversely affected by oxidation of the tannins. It is often desirable to incorporate antioxidants in the coating solution. Such addition does not adversely affect the properties or performance of the coating solutions. It has been found that when sodium ascorbate or ascorbic acid is incorporated in the coating solution, in amounts in the range of about 0.02% to about 0.10% by weight, such addition significantly retards oxidation of the tannin and also retards increase in adsorption time. Any other antioxidant may be employed, such as sodium dithionite, sodium "phenolic acid," and the like.

In order to rate the various coatings, as particularly set forth in the specific examples which follow hereinafter, there has been devised a rating scale with respect to paper and sandy buildup. An uncoated reactor, referred to as the control, where normal amounts of both types of buildup occur, is given a rating of 1.5. Any rating below 1.0 is good or a definite improvement. In other words, 0.0 rating is perfect, and so on.

In order to further illustrate the present invention, the following specific examples are given. It is to be understood, however, that this is merely intended in an illustrative and not limitative sense. In the examples, all parts and percents are by weight unless otherwise indicated.

EXAMPLE I

In this example a coating solution was made up by dissolving tannic acid in demineralized water to give a 1% by weight tannic acid solution. Dissolution took place at 25° C. (or room temperature) with stirring in approximately 10 minutes. The coating solution was sprayed on all the internal surfaces of a 3 liter polymerization reactor and the coating thereon was flushed with tap water. The surfaces had a $\gamma_c$ greater than 72 dynes/centimeter. The following recipe was then charged to the reactor in usual fashion:

| | |
|---|---|
| Vinyl Chloride | 1000 grams |
| Water (demineralized) | 2055 grams |
| 88% hydrolyzed polyvinyl acetate | 0.5 gram |
| SBP[(1)] Catalyst | 0.5 cc. |

[(1)]di-secondary butyl peroxydicarbonate (1) di-secondary butyl peroxydicarbonate The reaction was carried out with a full reactor, that is, sufficient water was added to fill the reactor and at a temperature of 57° C. with agitation. The reaction was continued with addition of water as the mixture shrank because of the formation of polymer in order to keep the reactor full. The reaction was discontinued upon the addition of 400 grams of water. The contents of the reactor were then removed in usual fashion. The same procedure of coating and polymerization was repeated two more times making a total of three cycles or charges. Thereafter, the internal surfaces were examined and classified in accordance with the aforementioned procedure for rating said surfaces. The rating was as follows: Paper buildup 0.10 and sandy buildup 0.01. This is far superior to the control or uncoated reactor, which had a rating of 1.5. Further, no change in color of the polymer occurred and no off-white polymer particles were present.

The above procedure was repeated using a coating solution containing 0.1% by weight of tannic acid. The rating after three cycles was approximately 0.0 in the case of both paper and sandy buildup.

EXAMPLE II

In this example, several coating solutions were made up in the same manner as described in Example I using different tannin extracts. The coating solutions were as follows:

| | | |
|---|---|---|
| 1. | Chestnut Tannin | 1.0% |
| 2. | Chestnut Tannin | 0.1% |
| 3. | Wattle Tannin | 1.0% |
| 4. | Quebracho Tannin | 1.0% |
| 5. | Myrobalans Nuts | 7.0% |

The reactor was coated with each of the 6 solutions in the same manner as in Example I. The coated surfaces had a $\gamma_c$ greater than 72 dynes/centimeter. Using the recipe of Example I and the polymerziation procedure described therein, three cycles or batches were made with each of the coatings. The results of buildup after 3 cycles is set forth in the following table:

TABLE I

| Coating | | Paper Buildup | Sandy Buildup |
|---|---|---|---|
| 1. | Chestnut Tannin (1.0%) | 0.2 | 0.0 |
| 2. | Chestnut Tannin (0.1%) | 0.0 | 0.0 |
| 3. | Wattle Tannin | 0.0 | 0.1 |
| 4. | Quebracho Tannin | 0.6 | 0.1 |
| 5. | Myrobalans Nuts | 0.5 | 0.2 |

In all cases, improved results over the control were obtained.

EXAMPLE III

In this example, an ammonium tannate coating solution was employed and a dispersion PVC resin was made using the emulsion polymerization technique. The coating solution was made up as in Example I and contained the following ingredients:

| | |
|---|---|
| Tannic Acid | 0.10% |
| Ascorbic Acid | 0.05% |
| $Ca^{++}$ | 20 ppm |
| $Mg^{++}$ | 3 ppm |
| $H_2O$ | 99.8% |

A sufficient portion of the demineralized water was replaced with tap or city water to give the concentration of calcium and magnesium ions indicated. After dissolution of the materials (about 10 minutes) $NH_4OH$ was added to the solution until a pH of 7 was reached. This addition converted the tannic acid to ammonium tannate. The reactor was then coated by spraying the solution on the inner surfaces and rinsing with tap water. The coated surfaces had a $\gamma_c$ greater than 72 dynes per centimeter in less than 5 seconds. The following recipe was then charged to the reactor in usual fashion:

| | |
|---|---|
| Vinyl Chloride | 100 parts |
| Water (demineralized) | 100 parts |
| Alcohol (1) | 2.1 parts |
| Lauric acid | 2.0 parts |
| $NH_4OH$ | 0.33 part |
| Tert-butyl peroxypivalate | 0.04 part |

(1) Mixture of $C_{12}$ and $C_{18}$ straight chain alcohols.

Thereafter, the contents of the reactor were heated to the polymerization temperature, namely, 45° C. and held there throughout the reaction until the desired conversion was obtained (evidenced by a drop in pressure to 50 psig.). No water was added to the reactor, as in Example I. The reactor was then cooled, vented and emptied. The reactor was rinsed and recoated as before. This procedure was repeated through 3 cycles or batches. The same recipe was polymerized in an uncoated reactor as a control. The results with respect to buildup were as follows:

| Buildup | Control | 1st Cycle | 2nd Cycle | 3rd Cycle |
|---|---|---|---|---|
| Blades & Shaft | 1/16-1/8" | Spotless | Spotless | Clean |
| Walls | 1/16-1/8" | Clean | Mostly Clean | Mostly Clean |
| Dome | 1/16-1/8" | Clean | Clean | Clean |

This shows the improvement in the prevention of buildup in emulsion polymerization as well as in suspension polymerization.

Coating of the internal surfaces of the polymerization reactor, in accordance with the present invention, substantially reduces, and in many cases, practically eliminates polymer buildup on said surfaces during the polymerization reaction and thus results in increased production over a unit period of time. In those instances where a little polymer buildup does accumulate on the interior surfaces, it is not of the hard, rough, difficult-to-remove type and is easily removed without employing the difficult and tedious scraping methods that are presently necessary in the art. More importantly, the present invention enables one to operate a closed polymerization system, which, in the case of vinyl chloride polymerization, has the advantage of reducing drastically the parts per million of vinyl chloride in the atmosphere of the plant. Such reduction in vinyl chloride in the atmosphere meets the requirements recently promulgated by OSHA (Occupational Safety and Health Administration) and EPA (Environmental Protection Agency). Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

I claim:

1. In a polymerization method for the production of polymers and copolymers of vinyl and vinylidene halides, when polymerized alone or with other vinylidene monomers having a terminal $CH_2=C<$ group or with polymerizable polyolefinic monomers, said polymerization being conducted in a polymerization vessel, wherein the improvement comprises the steps of coating the internal surfaces of said vessel prior to polymerization with an aqueous solution containing 0.03 to about 5% by weight tannin, said tannin being selected from the group consisting of hydrolyzable tannins, condensed tannins, ammonium tannates and tannins complexed with metal ions and rinsing the coated surface with tap water whereby undesirable polymer build up is reduced.

2. A process as defined in claim 1 wherein the tannin is tannic acid.

3. A process as defined in claim 1 wherein the tannin is ammonium tannate.

4. A process as defined in claim 1 wherein the tannin is chestnut tannin.

5. A process as defined in claim 1 wherein the tannin is quebracho tannin.

6. A process as defined in claim 1 wherein the tannin is wattle tannin.

7. A process as defined in claim 1 wherein the coating solution contains from about 0.02 to about 0.10% by weight of an antioxidant.

8. A process as defined in claim 1 wherein the coating solution contains from about 0.03 to about 5.0% by weight of tannic acid.

9. A process as defined in claim 8 wherein the coating solution contains from about 0.02 to about 0.1% by weight of an antioxidant.

10. A process as defined in claim 1 wherein the coating solution contains from about 20 ppm. to about 200 ppm. of one or more metal ions selected from the group consisting of calcium, magnesium, and aluminum.

11. A process as defined in claim 10 wherein the coating solution contains from about 0.02 to about 0.1% by weight of an antioxidant.

* * * * *

UNITED STATES PATENT AND TRADEMARK OFFICE
CERTIFICATE OF CORRECTION

PATENT NO. : 4,105,840
DATED : August 8, 1978
INVENTOR(S) : LOUIS COHEN

It is certified that error appears in the above—identified patent and that said Letters Patent are hereby corrected as shown below:

Column 1, line 13, "different" should be ---efficient---.
Column 4, line 19, "dyness" should be ---dynes--.
Column 4, line 22, "dyness" should be ---dynes---.
Column 7, line 29, delete "(1) di-secondary butyl peroxydicarbonate"

Signed and Sealed this

Fifteenth Day of May 1979

[SEAL]

Attest:

RUTH C. MASON
Attesting Officer

DONALD W. BANNER
Commissioner of Patents and Trademarks